United States Patent
Threlkeld et al.

(10) Patent No.: US 10,697,112 B2
(45) Date of Patent: Jun. 30, 2020

(54) FLAME RETARDANT COMPOSITION, FLAME RETARDANT FIBER AND FABRIC FORMED USING THE SAME, AND METHOD FOR THEIR PRODUCTION

(71) Applicant: SUPREME CORPORATION, Hickory, NC (US)

(72) Inventors: James O Threlkeld, Indian Trail, NC (US); Matthew L. Kolmes, Denver, NC (US)

(73) Assignee: SUPREME CORPORATION, Hickory, NC (US)

( * ) Notice: Subject to any disclaimer, the term of this patent is extended or adjusted under 35 U.S.C. 154(b) by 0 days.

(21) Appl. No.: 15/277,420

(22) Filed: Sep. 27, 2016

(65) Prior Publication Data

US 2017/0284014 A1    Oct. 5, 2017

Related U.S. Application Data

(63) Continuation-in-part of application No. 15/089,942, filed on Apr. 4, 2016.

(51) Int. Cl.
| | |
|---|---|
| *D06M 11/71* | (2006.01) |
| *C09K 21/04* | (2006.01) |
| *C09K 21/14* | (2006.01) |
| *D06M 15/263* | (2006.01) |
| *D06M 101/20* | (2006.01) |
| *D06M 101/38* | (2006.01) |

(52) U.S. Cl.
CPC ............ *D06M 11/71* (2013.01); *C09K 21/04* (2013.01); *C09K 21/14* (2013.01); *D06M 15/263* (2013.01); *D06M 2101/20* (2013.01); *D06M 2101/38* (2013.01); *D06M 2200/30* (2013.01)

(58) Field of Classification Search
CPC .............................. D06M 11/71; C09K 21/04
See application file for complete search history.

(56) References Cited

U.S. PATENT DOCUMENTS

| | | | |
|---|---|---|---|
| 2,262,634 A | 11/1941 | Cobbs et al. | |
| 4,842,611 A | 6/1989 | Huffman | |
| 6,172,163 B1 * | 1/2001 | Rein | B29C 67/24 264/136 |
| 8,344,055 B1 * | 1/2013 | Mabey | C08K 3/38 524/416 |
| 2004/0152378 A1 | 8/2004 | Stanhope et al. | |
| 2005/0287894 A1 * | 12/2005 | Burns | A47C 31/001 442/136 |
| 2008/0206513 A1 | 8/2008 | Malz et al. | |
| 2010/0090365 A1 | 4/2010 | Schuette et al. | |
| 2013/0164519 A1 * | 6/2013 | Davis | C08K 5/521 428/221 |
| 2014/0213131 A1 | 7/2014 | Ghosh et al. | |

OTHER PUBLICATIONS

International Search Report and Written Opinion dated Apr. 9, 2018 in PCT/US17/25748.

* cited by examiner

*Primary Examiner* — Arrie L Reuther
(74) *Attorney, Agent, or Firm* — Oblon, McClelland, Maier & Neustadt, L.L.P.

(57) ABSTRACT

A flame retardant composition containing a phosphorous containing ammonium salt, a crosslinker, and water is provided, and its application to yarn or fabric to provide a flame retardant yarn or fabric. In a preferred embodiment, the yarn or fabric is made from a polyurethane elastomer, such as a spandex. A method to prepare the flame retardant composition and apply it to the fiber or yarn is also provided.

21 Claims, No Drawings

FLAME RETARDANT COMPOSITION, FLAME RETARDANT FIBER AND FABRIC FORMED USING THE SAME, AND METHOD FOR THEIR PRODUCTION

CROSS-REFERENCE TO RELATED APPLICATIONS

The present application is a Continuation-in-Part of, and thus claims priority to, U.S. application Ser. No. 15/089,942, filed Apr. 4, 2016, the entire contents of which are hereby incorporated by reference in their entirety.

BACKGROUND OF THE INVENTION

Field of the Invention

The present invention relates to a flame retardant composition, a fiber having flame retardant property using the composition, a method to prepare the composition, and a fabric comprising the fiber.

Description of the Related Art

Elastomeric polyurethanes are conventionally employed throughout the textile industry to prepare textile fabrics having good stretch and recovery properties. Commonly employed elastomeric polyurethanes are generically described as spandex, a term applied to a host of polyurethanes constructed of soft and rubbery segments of polyester or polyether polyols and hard segments of urethane or urethane-urea units. These hard segments provide rigidity and tensile strength to fibers prepared from the elastic polyurethane while the soft segments allow the fiber to stretch up to 600% and yet recover the original shape when tension is relaxed.

Typically the elastomeric polyurethanes such as spandex have been blended at a maximum level of approximately 20% by weight with other synthetic fibers or natural fibers such as cotton, wool, silk and linen in the preparation of finished textiles, most commonly in the undergarment and athletic wear industries. However, recent developments in the industry are leading to introduction to or increased utility of elastomeric polyurethanes into other applications such as more formal clothing segments, upholstery and automotive coverings. The expansion of utility of elastomeric polyurethanes to an even wider range of applications would be facilitated and promoted if an elastomeric fiber having flame retardant properties were available. However, polyurethane elastomer fibers, including spandex fibers, having flame retardant properties are not readily available and a need exists in the industry for such fibers.

Polyurethane foams having flame retardance are generally described in the Kirk-Othmer Encyclopedia of Chemical Technology (Fifth Edition, Vol. 25, page 469). Flame retardants are either of the reactive type, such as reactive diols which are chemically incorporated into the polymer network or nonreactive types which are physically blended with the polyurethane composition. Examples of such physical blend materials are mineral fillers such as alumina trihydrate and organic fillers such as melamine. However, typical reactive type flame retardants are not useful in elastomeric polyurethanes because such would be detrimental to the stretch and other physical properties of the fiber. Conventional nonreactive flame retardant additives are either not compatible with the elastomeric polyurethane or may react with polymer linkages leading to degradation of the polymer and its performance.

Rock et al. (U.S. Pat. No. 7,776,421) describes composite velour fabric garment which includes a laminate consisting of an outer woven shell layer containing spandex in at least a weft direction for stretch and recovery in a width direction. The outer shell layer comprises flame retardant fibers, e.g. formed of one or more materials selected from the group consisting of: aramides, melamines, FR polyesters, inherent flame retardant materials, and blends thereof. Flame retardant fibers include aramides, e.g. as sold under the trademark NOMEX® by E.I. du Pont de Nemours and Co., Inc., of Wilmington, Del., or blends of fibers, such as NOMEX® (aramide fibers), KEVLAR® (para-aramide fibers, also available from E.I. du Pont). Nowhere does this reference disclose or suggest a polyurethane elastomer composition or fiber having flame retardant property.

The use of oliogomeric phosphoric acid esters to provide flame resistance to polyurethane foams has been described. For example, Sicken et al. (U.S. Pat. No. 5,985,965) describe flame-resistant polyurethanes containing as flameproofing agents, mixtures of oligomeric phosphoric acid esters which carry hydroxyalkoxy groups. The oligomeric phosphoric acid esters are prepared by reaction of a trialkyl phosphate with phosphorous pentoxide, then partially hydrolyzing or glycolyzing formed P—O—P bonds and reacting the resulting partial ester with an epoxides.

Bradford et al. (U.S. Pat. No. 6,262,135) describes a flame retardant blend for use in a polyurethane foam containing a monomeric halogenated compound and an oligomeric organophosphate. The oligomeric organophosphate is obtained by reaction of a trialkyl phosphate with phosphorous pentoxide to form a polyphosphate ester which is further reacted with an epoxide such as ethylene oxide.

Bradford et al. (U.S. Pat. No. 7,288,577) further describes a non-halogen containing flame retardant blend for use in a polyurethane foam containing a phosphate ester and the oligomeric organophosphate described in U.S. Pat. No. 6,262,135.

In various activities, such as auto racing where a driver may have to be seated for extended periods of time, it is desirable to wear articles of compression clothing to help avoid formation of blood clots in the legs. However, in certain of these activities, such as auto racing, there is also a need for clothing to be flame retardant. However, such flame retardancy must pass a rigorous testing regimen known as the SFI 3.3 test (SFI Foundation Inc. Specification 3.3). This test has two components: A TPP or thermal protective properties test, and a burn test.

However, none of the cited references discloses or suggests a flame retardant composition, or a fiber formed therewith, particularly a polyurethane elastomer composition, that can meet the standards under the SFI 3.3 test. Accordingly, such a composition, yarn and fabric are needed.

SUMMARY OF THE INVENTION

Accordingly, one objective of the present invention is to provide a flame retardant composition that can be used to render fibers flame retardant.

A further object of the present invention is to provide a yarn having flame retardant property and a fabric prepared therefrom. As used herein, the term flame-retardant refers to fabrics and other materials that, due to chemical treatment or inherent properties, do not ignite readily or propagate flaming under small-to-moderate fire exposure. See, e.g., Fire Protection Handbook (17.sup.th Edition), National Fire Protection Association, Quincy, Mass., 1992. (p. 3-174).

A further objective of the present invention is to provide a fiber of a elastomeric polyurethane having flame retardant property.

Another objective of the present invention is to provide a method to prepare a polyurethane elastomer composition having flame retardant property.

A still further objective of the present invention is to provide a method for preparing a fiber of a elastomeric polyurethane having flame retardant property.

A further objective is to provide a yarn containing a fiber of a elastomeric polyurethane having flame retardant property.

An additional objective is to provide a fabric made from at least the fiber or yarn of the present invention in an amount sufficient to provide stretch properties along with maintaining flame retardancy.

These and other objects, individually or in combinations thereof, have been achieved by the discovery of a flame retardant composition, comprising: a phosphorous containing ammonium salt, a crosslinker, and water, a flame retardant fiber prepared using the composition, and a method for preparing the composition.

The foregoing paragraphs have been provided by way of general introduction, and are not intended to limit the scope of the following claims. The presently preferred embodiments, together with further advantages, will be best understood by reference to the following detailed description.

DETAILED DESCRIPTION OF THE PREFERRED EMBODIMENTS

Applicants have recognized the need for a flame retardant composition that can be applied to a fiber or yarn, particularly an otherwise flammable yarn, such as a polyolefin yarn, ultra-high molecular weight polyolefin yarn, or a polyurethane elastomer yarn, especially a yarn such as ultra-high molecular weight polyethylene (UHMWPE) (such as SPECTRA or DYNEEMA) or polyurethane elastomer (such as spandex), in order to render it flame retardant. Surprisingly, Applicants have discovered that a flame retardant property may be added to a yarn or fiber, such as a UHMWPE or a polyurethane elastomer composition, by adding a combination of a phosphorous containing ammonium salt, a crosslinker, and water to the surface of a yarn or fabric made from the yarn.

Thus, in a first embodiment, the present invention provides a flame retardant composition, comprising a phosphorous containing ammonium salt, a crosslinker agent, and water. The flame retardant composition can be applied to a yarn or fiber to render it flame retardant. The yarn can be any conventionally flammable yarn. Preferably, the yarn is an UHMWPE or polyurethane elastomer yarn, but can be any conventional type of yarn. Most preferably, the yarn is a spandex yarn.

In one embodiment, the yarn is a high molecular weight polyolefin, preferably ultra-high molecular weight polyethylene (UHMWPE) or high molecular weight polypropylene. U.S. Pat. No. 4,457,985, hereby incorporated by reference, generally discusses high molecular weight polyethylene and polypropylene fibers. In the case of polyethylene, suitable fibers are those of molecular weight of at least 150,000, preferably at least 400,000, more preferably at least one million and most preferably between two million and five million. Such extended chain polyethylene (ECPE) (or ultra-high molecular weight polyethylene, UHMWPE) fibers may be grown in solution as described in U.S. Pat. Nos. 4,137,394 or 4,356,138, hereby incorporated by reference, or may be a filament spun from a solution to form a gel structure, as described in German Off. 3 004 699 and GB 2 051 667, and especially described in U.S. Pat. No. 4,551,296, hereby incorporated by reference. As used herein, the term polyethylene preferably means a predominantly linear polyethylene material that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as lubricants, colorants and the like which are commonly incorporated by reference. Depending upon the formation technique, the draw ratio and temperatures, and other conditions, a variety of properties can be imparted to these fibers.

For example, ultra-high molecular weight polyethylene filaments produced commercially by Honeywell Corp. under the trade name SPECTRA or by DSM under the trade name DYNEEMA and having moderately high moduli and tenacity are particularly useful.

Similarly, highly oriented polypropylene of molecular weight at least 200,000, preferably at least one million and more preferably at least two million, may be used. Such high molecular weight polypropylene may be formed into reasonably well oriented fibers by techniques described in the various references referred to above, and especially by the technique of U.S. Pat. Nos. 4,663,101 and 4,784,820, hereby incorporated by reference, and U.S. patent application Ser. No. 069,684, filed Jul. 6, 1987 (see published application WO 89 00213).

The polyurethane elastomer can be any polyurethane elastomer, and is preferably obtained by polymerization of monomer components, comprising an aromatic diisocyanate; a polyether glycol and an alkyl amine having at least two nitrogens with hydrogen reactive to isocyanate groups.

The aromatic diisocyanate may be one or more selected from the group consisting of 2,4-toluene-diisocyanate, 2,6-toluene-diisocyanate, 4,4'-diphenylmethane-diisocyanate, 2,4'-diphenylmethane-diisocyanate and 2,2'-diphenylmethane-diisocyanate.

The polyether glycol may preferably be a polytetramethylene glycol (PTMEG).

The alkyl amine having at least two nitrogens with hydrogen reactive to isocyanate groups may be one or more selected from the group consisting of ethylene diamine, propylene diamine and diethylenetriamine.

The polyurethane elastomer composition may further comprise at least one additive selected from the group consisting of an antioxidant, a colorant, a metal scavenger, a lubricant, a plasticizer and a processing aid in a content which does not adversely affect the performance properties of the polyurethane elastomer composition.

In a further preferred embodiment, the present invention provides a method for preparing a flame retarded yarn composition, preferably a polyurethane elastomer composition comprising combining the phosphorous containing ammonium salt and the crosslinker in a manner to avoid precipitation from the mixture. Preferably, the crosslinker is mixed into an aqueous solution of the phosphorous containing ammonium salt, with the crosslinker being added slowly while stirring. The combination is then applied to the fiber, or a fabric or yarn made containing the fiber. The composition can be applied in any desired manner, including but not limited to spraying, dipping or applying with a contact roller. Preferably, the composition is applied to the fiber, yarn or fabric in an amount of up to 110% wet out, most preferably from 100-110% wet out.

In a highly preferred embodiment, the polyurethane elastomer is a spandex.

The fiber or yarn of the present invention can be used to prepare fabrics having stretch properties, while maintaining flame retardant properties. The fabrics of the present invention can contain any desired level of yarn made from the flame retardant yarn of the present invention. Preferably, the amount of yarn of the present invention in a given fabric is in a range of from 1 to 100% by weight, with the remainder of the yarn in the fabric being any other yarn, including other conventional flame retardant yarn (referred to as "hard yarns" due to their lack or, or lower level of, elastomeric properties). These conventional flame retardant hard yarns can be any conventional FR yarn, including but not limited to, FR polyester, FR nylon, FR acrylic, etc. In preferred embodiments, the fabric is useful for clothing and contains from 2 to 35% by weight, more preferably from 5 to 20% by weight, most preferably from 9 to 14% by weight, of the flame retardant yarn of the present invention, with the remainder being one or more other types of yarns. The fabric can be prepared by any desired method, and is preferably knit.

Burn tests using fabrics from the present invention desirably provide flame resistance measurements that meet or exceed the SFI 3.3 standard, the entire contents of which are hereby incorporated by reference.

In a further embodiment of the present invention, the combination of phosphorous containing ammonium salt and crosslinker can be applied to any type of yarn to provide flame retardancy properties. Other types of yarn to which it can be applied include, but are not limited to, nylon, cotton, wool, polyester, acrylic, polyolefin, etc.

In the present invention, the phosphorous containing ammonium salt is preferably an inorganic phosphate ammonium salt. A preferred inorganic phosphate ammonium salt is FP 2493, obtained from Apexical. The crosslinker is preferably an acrylic latex emulsion, preferably selected from Apex 903, also available from Apexical. The present inventors have found that combining the preferred inorganic phosphate salt with the acrylic latex emulsion crosslinker resulted in formation of a precipitate and poor flame retardancy properties. However, by adding a small amount of water to either of the components, when mixed with the other component, the resulting mixture was stable with no precipitate formed. The amount of water added can range from 1 to 50% by weight of the flame retardant composition (total of the amounts of the alkaline salt and crosslinker), preferably from 5 to 35% by weight, more preferably from 25-30% by weight, most preferably from 26-28% by weight. This permits application of the flame retardant mixture to the yarn or fabric with consistent coverage and with good flame retardancy results. In preferred embodiments using a spandex fiber and fabric, the resulting treated product passed the SFI 3.3 test.

The flame retardant composition of the present invention preferably contains an amount of crosslinker of from 40 wt % to 0.1 wt %, based on total amount of phosphorous containing ammonium salt. More preferably the amount of crosslinker is from 2 wt % to 0.5 wt %, based on amount of phosphorous containing ammonium salt. An additional advantage of the flame retardant composition of the present invention is that it provides a durable flame retardancy property that will last through at least 5 wash cycles, more preferably through at least 8 wash cycles, most preferably through at least 10 wash cycles.

The flame retardant composition of the present invention can also be applied to articles, such as pads or other items covered by a fabric surface.

Obviously, numerous modifications and variations of the present invention are possible in light of the above teachings. It is therefore to be understood that within the scope of the appended claims, the invention may be practiced otherwise than as specifically described herein.

The invention claimed is:

1. A flame retardant composition, comprising: an inorganic phosphate ammonium salt, a crosslinker, and water, wherein the crosslinker is an acrylic latex emulsion, wherein the acrylic latex emulsion is present in an amount of from 0.5 wt % to 2 wt %, relative to total amount of inorganic phosphate ammonium salt.

2. The flame retardant composition of claim 1, wherein the amount of water is from 5 to 35% by weight based on total amount of composition.

3. The flame retardant composition of claim 1, wherein the composition comprises water in an amount of from 26-28% by weight.

4. A flame retardant fiber, comprising a fiber having coated on at least a portion of a surface of the fiber the flame retardant composition of claim 1.

5. The flame retardant fiber of claim 4, wherein the fiber comprises at least one member selected from the group consisting of nylon, cotton, wool, polyester, acrylic, polyolefin, and polyurethane elastomer.

6. The flame retardant fiber of claim 5, wherein the fiber comprises a polyurethane elastomer.

7. The flame retardant fiber of claim 6, wherein the polyurethane elastomer is a polyurethane-urea elastomer obtained by polymerization of monomer components, comprising: an aromatic diisocyanate; a polyether glycol; and an alkyl amine having at least two nitrogens with hydrogen reactive to isocyanate groups.

8. The flame retardant fiber of claim 7, wherein the aromatic diisocyanate is selected from the group consisting of 2,4-toluylene-diisocyanate, 2,6-toluylene-diisocyanate, 4,4'-diphenylmethane-diisocyanate, 2,4'-diphenylmethane-diisocyanate, 4,4'-diphenylmethane-diisocyanate, 2,2'-diphenylmethane-diisocyanate, and a mixture thereof.

9. The flame retardant fiber of claim 7, wherein the aromatic diisocyanate is 4,4'-diphenylmethane-diisocyanate, and the polyether glycol is a polytetramethylene ether glycol (PTMEG) having a molecular weight of from 1800 to 2200.

10. The flame retardant fiber of claim 9, wherein the molecular weight of the PTMEG is 2000.

11. The flame retardant fabric according to claim 10, further comprising one or more additional fibers.

12. The flame retardant fiber of claim 9, wherein the alkyl amine having at least two nitrogens with hydrogen reactive to isocyanate groups is selected from the group consisting of ethylene diamine, propylene diamine and diethylenetriamine.

13. The flame retardant fiber of claim 6, wherein the fiber is a spandex fiber.

14. The flame retardant fiber of claim 5, wherein the fiber comprises a polyolefin.

15. The flame retardant fiber of claim 14, wherein the polyolefin is an ultra-high molecular weight polyethylene.

16. A flame retardant fabric comprising the flame retardant fiber of claim 4.

17. A method for preparing the flame retardant composition of claim 1, comprising:
   adding the acrylic latex emulsion slowly into an aqueous solution of the inorganic phosphate ammonium salt, while stirring the composition during the adding to avoid precipitation.

18. The method of claim 17, wherein the flame retardant composition formed contains an amount of water from 5 to 35% by weight based on total amount of composition.

19. A flame retardant composition, consisting of: an inorganic phosphate ammonium salt, a crosslinker, and water, wherein the crosslinker is an acrylic latex emulsion, wherein the acrylic latex emulsion is present in an amount of from 0.5 wt % to 2 wt %, relative to total amount of inorganic phosphate ammonium salt.

20. The flame retardant composition of claim 19, wherein the amount of water is from 5 to 35% by weight based on total amount of composition.

21. The flame retardant composition of claim 19, wherein the amount of water is from 26-28% by weight based on total amount of composition.

\* \* \* \* \*